US009785803B2

(12) United States Patent
Lee et al.

(10) Patent No.: US 9,785,803 B2
(45) Date of Patent: Oct. 10, 2017

(54) METHOD, APPARATUS AND SYSTEM FOR COLLECTING TAGS USING BIT MAP IN RFID SYSTEM

(71) Applicant: RESEARCH & BUSINESS FOUNDATION SUNGKYUNKWAN UNIVERSITY, Suwon-si (KR)

(72) Inventors: Tae Jin Lee, Suwon-si (KR); Jae Young Lee, Suwon-si (KR); Min Gyu Lee, Seongnam-si (KR); Ji Hyoung Ahn, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 63 days.

(21) Appl. No.: 14/700,416

(22) Filed: Apr. 30, 2015

(65) Prior Publication Data

US 2015/0317500 A1 Nov. 5, 2015

(30) Foreign Application Priority Data

Apr. 30, 2014 (KR) .................. 10-2014-0052539

(51) Int. Cl.
*G06K 7/10* (2006.01)
*G06K 7/00* (2006.01)
*H04W 74/08* (2009.01)

(52) U.S. Cl.
CPC ....... *G06K 7/10039* (2013.01); *G06K 7/0008* (2013.01); *G06K 7/10207* (2013.01); *H04W 74/085* (2013.01)

(58) Field of Classification Search
CPC ............ G06K 7/10207; G06K 7/0008; H04W 74/085; H01Q 1/2216
(Continued)

(56) References Cited

U.S. PATENT DOCUMENTS 7,936,271 B2 * 5/2011 Karr .................. G01S 5/14
340/539.13
2010/0118698 A1 * 5/2010 Yokobori ............ H04W 74/085
370/230
(Continued)

FOREIGN PATENT DOCUMENTS

| KR | 10-2010-0009486 | * | 2/2010 | ............... H04B 5/00 |
| KR | 10-1042389 B1 | | 6/2011 | |
| KR | 10-2012-0133247 A | | 12/2012 | |

OTHER PUBLICATIONS

Korean Office Action dated Jan. 16, 2015, in counterpart Korean Application No. 10-2014-0052539 (6 pages, in Korean).
(Continued)

*Primary Examiner* — Mirza Alam
(74) *Attorney, Agent, or Firm* — NSIP Law

(57) ABSTRACT

Disclosed are a method, an apparatus, and a system for collecting tags which may reduce recognition time and energy consumption as compared with a tag collection technology in an active radio frequency identification (RFID) system standard according to the related art. The method for collecting tags by an apparatus for collecting the tags in a RFID system, one collection round including: recognizing tags; and collecting data from recognized tags, wherein the recognizing of the tags comprises one scan period, and comprises repeatedly performing a scan process until the tags are recognized using a bit map indicating a recognition status of the tags within one scan period.

19 Claims, 10 Drawing Sheets

(58) Field of Classification Search
USPC .......................................................... 340/10.1
See application file for complete search history.

(56) References Cited

U.S. PATENT DOCUMENTS

2010/0134257 A1\* 6/2010 Puleston .............. G06K 7/0008
340/10.4
2011/0316676 A1\* 12/2011 Bajic .................... G06K 7/0008
340/10.33

OTHER PUBLICATIONS

Korean Notice of Allowance dated Feb. 1, 2016, in counterpart Korean Application No. 10-2014-0052539 (5 pages, in Korean).

\* cited by examiner

METHOD, APPARATUS AND SYSTEM FOR COLLECTING TAGS USING BIT MAP IN RFID SYSTEM

CROSS-REFERENCE TO RELATED APPLICATIONS

This application claims the benefit of priority of Korean Patent Application No. 10-2014-0052539 filed on Apr. 30, 2014, all of which are incorporated by reference in their entirety herein.

BACKGROUND OF THE INVENTION

Field of the Invention

The present invention relates to a method and an apparatus for collecting tags through tag recognition, and more particularly to a method and an apparatus for collecting tags through tag recognition in an active radio frequency identification (RFID)

Description of the Related Art

An RFID technology is a technology where a reader may recognize information on a tag attached to an object in non-contact communication. The RFID tag may be categorized into an active tag and a passive tag according to whether to supply power. The active tag includes a battery therein so that power may be self-supplied. The passive tag use an induction current obtained through electromagnetic induction between the reader and the tag. Since the active RFID tag includes a battery therein, the active RFID tag may be recognized at a wider range and may store more data as compared with the passive RFID tag. The active RFID tag may be recognized even if the active RFID tag is attached to metal. Because of the above characteristics, the active RFID tag may be used in a logistics management system in an airport or a harbor to manage a plurality of objects, and may be variously used in a national defense field and an industrial field.

In the RFID system, readers collect information of tags in a recognition range periodically or when there is necessary information. Such a process of collecting the information refers to tag collection. A time required for tag collection is one important parameter representing performance of an RFID system. When a plurality of tags transmits simultaneously in a collection process, collision may occur during a process of receiving information by a reader. Such collision problem increases a tag collection time. If the number of tags is increased, the collision problem becomes more severe. In order to solve the collision problem, an anti-collision algorithm is used in a tag collection.

There were existing standard technologies with respect to the active RFID system which includes the anti-collision algorithm between tag and reader. The standards define a protocol and the anti-collision algorithm to transmit data between a reader and a tag in an active RFID system operating on a 433 MHz frequency band. In the standards, the reader broadcasts a wake up command such that tags are switched to a preparation state which may respond to the command before tag collection. After transmitting the wake up command, the reader starts a collection round by broadcasting a tag collection command. Since the data in the active tag is more than that in the passive tag, in order to reduce energy consumption due to collision upon transmission of data, a collection round of the active tag is divided by a listen period (LP) and an acknowledge period (AP). The tag collection command includes a window size and the window size represents a length of LP (i.e., the number of slots in LP) from which the tag may select a slot. If tags receive collection command representing start of the tag collection, the tags select an arbitrary slot in the LP period using an anti-collision algorithm based on Aloha to transmit a tag ID thereof. The tags generates a random integer ranging from 1 to the window size, and transmit a tag response including a tag-ID as a response thereof to the collection command in a slot corresponding to the random integer number.

A state of each slot at the LP is divided into three cases according to the number of tag responses at the slot. A first case represents a success slot which receives one response and is successfully recognized. The second case represents a collision slot where collision occurs because a plurality of tags responds. A third case represents an idle slot to which the tag is not responded. If the LP is terminated, the reader starts AP by transmitting a read command in point-to-point correspondence in the order of succeeding the recognition at the LP. If the tag receives the read command, the tag transmits data. If the data is successfully received from the tag, the reader transmits a sleep command in order to reduce power consumption of the tag. The tag switched to a sleep mode through reception of the sleep command does not respond commands from the reader in a next collection round. Tags which are not recognized by the reader pass through other repeated collection round. If one collection round is terminated, the reader estimates a window size to be used at an LP of a next collection round through an LP of a previous collection round. If a new collection round starts, the reader broadcasts the collection command and estimated window size therein. Tags which are not recognized at a previous collection round select an arbitrary slot in the window size to transmit a response.

FIG. 1 illustrates an operation of tag collection of the existing standard. An environment including one reader and five tags within a recognition range is considered. The reader transmits a wake up command such that tags within a recognition range become a preparation state. The reader then transmits the collection command to start LP. Tags receiving the collection command including the window size select a slot within the window size range. In FIG. 1, tag 1 and tag 4 transmit response with a tag-ID thereof without collision. Tag 1, tag 3 and tag 5 simultaneously transmit the response with tag-ID to the same slot so that collision occurs. The reader transmits a read command to the tag 2 and the tag 4 which are successfully recognized. The reader transmits the read command in an order of successful recognition at an LP of the same collection round. The tag 2 receiving the read command transmits a tag-ID and additional data to the reader. If the reader successfully receives the data of tag 2, the reader transmits a sleep command to tag 2 so that the tag 2 can switch to sleep mode and reduce power consumption. In the same manner, the tag 4 is switched to a sleep mode after a data transmission process. The collided tags, i.e., tag 1, tag 3, and tag 5, are not switched to the sleep mode and transmit the response with tag-ID through the same process in a next collection round.

A tag collection method in the standards use point-to-point correspondence at the AP. Therefore, if the number of tags is increased, the control overhead at AP, e.g., the number of read and sleep commands, is also increased. At the AP, since the tag maintains an idle state until the sleep command is received after termination of the data transmission, the energy is consumed unnecessarily.

SUMMARY OF THE INVENTION

An object of the present invention is to provide a method, an apparatus, and a system for collecting tags which may reduce recognition time and energy consumption as compared with a tag collection technology in an active RFID system according to the related art.

In accordance with one aspect of the present invention, a method for collecting tags by an apparatus for collecting the tags in a radio frequency identification (RFID) system, one collection round including: recognizing tags; and collecting data from recognized tags, wherein the recognizing tags comprises one scan period, and comprises repeatedly performing a scan process until all tags are recognized using a bit map indicating a status of the slots within one scan period.

The recognition of the tags may include: broadcasting a wake-up command to tags within a tag recognition range; transmitting a first scan command including a window size to the tags; receiving response from tags including tag identifiers (IDs) from the tags; generating bit map indicating whether a tag in a slot within a first scan period based on the tag response; and repeatedly performing the scan process until all tags are recognized by transmitting a second scan command including the bit map to the tags.

Tags may receive a bit map included in the second scan command, and directly switch to a sleep mode when the tags are successfully recognized, and wait until a next wake-up command is received.

The second scan period may include a window size by the number of slots corresponding to the number of tags which are not recognized due to the collision, and the second scan command comprises window size information of the second scan period.

The second scan period may include collided slots corresponding to the number of collided slots at the first scan period and shared slots corresponding to the number of excluding the number of the collided slots from the window size of the second scan period.

Collision tags recognizing the collision through the bit map information may select one from the collided slot and the shared slot at the second scan period, and transmit a tag response from the one of the collided slot and the shared slot according to the selection.

The collision tag selecting the collided slot may select a slot corresponding to a collision order at the first scan period of the slot selected by the collision tag at the first scan period from the collided slots to transmit the selected slot at the second scan period.

The collision tag selecting the shared slot may select one from the shared slots to transmit the selected shared slot at the second scan period.

The bit map information may include bit information indicating an idle slot having no tag response, a recognition success slot, and a collided slot.

The collecting of the data from recognized tags may include: broadcasting a wake-up command to the tags; broadcasting a collection command to the tags; and receiving tag ID information and data from the tags, wherein the collection command may include tag recognition success order information of each of the tags.

The data may be received from the tags based on the order information, and tags terminating the data transmission are directly switched to a sleep mode.

In accordance with another aspect of the present invention, an apparatus for collecting tags in a radio frequency identification (RFID), the apparatus including: a controller which generates a bit map indicating recognition statuses of tags within one scan period, repeatedly performs a scan process until recognizing all tags using the bit map, and controls to collect data from the recognized tags when all tags are successfully recognized.

The controller may include: a transmission controller which controls to broadcast a wake-up command and a first scan command including a window size to tags within a tag recognition range; and a bit map generation to generate the bit map information based on a tag response including a tag identifier (ID) received from the tags, wherein the transmission controller controls to transmit a second scan command including the bit map information to the tags.

In accordance with another aspect of the present invention, a system for collecting tags in a radio frequency identification (RFID), the system including: an apparatus for collecting the tags which generates a bit map indicating recognition statuses of tags within one scan period, repeatedly performs a scan process until recognizing all tags using the bit map, controls to collect data from the recognized tags when all tags are successfully recognized; and a tag which transmits a tag response in a scan period, receives the bit map, determines whether the tag is successfully recognized to determine whether to transmit a tag response at a next scan period.

The apparatus for collecting the tags transmits a wake-up command and a first scan command including a window size to tags within a tag recognition range, receives a tag response including a tag identifier (ID) from the tags transmits a second scan command including bit map information indicating whether to recognize a tag in a slot within a first scan period based on the tag response; and the tag transmits a tag response at the first scan period, determines whether to transmit a tag response at a second scan period based on bit map information included in the second command, a tag which is successfully recognized at the first scan period is switched to a sleep mode, and a collision tag which is collided at a first scan period transmits a tag response at the second scan period.

The second scan period may include collided slots corresponding to the number of collided slots at the first scan period and shared slots corresponding to the number of excluding the number of the collided slots from the window size of the second scan period, and the collision tag selects one from the collided slot and the shared slot to transmit a tag response.

The collision tag selecting the collided slot may select a slot corresponding to a collision order at the first scan period of the slot selected by the collision tag at the first scan period from the collided slots to transmit the selected slot at the second scan period.

The collision tag selecting the shared slot may select one from the shared slots to transmit the selected shared slot at the second scan period.

The apparatus for collecting the tags broadcasts a wake-up command and a collection command including tag recognition success order information of the tags to the tags, receives tag ID and data from the tags, the tags transmit data from the tags based on the order information, and directly switches tags terminating data transmission to a sleep mode.

In accordance with the method for collecting tags according to the present invention, the reader stores slot state information obtained at an LP and reports the slot state information to the tags such that the tags may recognize whether the tags collide with each other. Collision is reduced by allowing tags which are not recognized due to the collision to select a slot to be transmitted during a process of attempting a next recognition based on the number of collided slots.

Further, the tag may sleep after termination of data transmission without receiving a sleep command at the AP to reduce battery consumption of the tag.

DETAILED DESCRIPTION OF EXEMPLARY EMBODIMENTS

Figure 1:
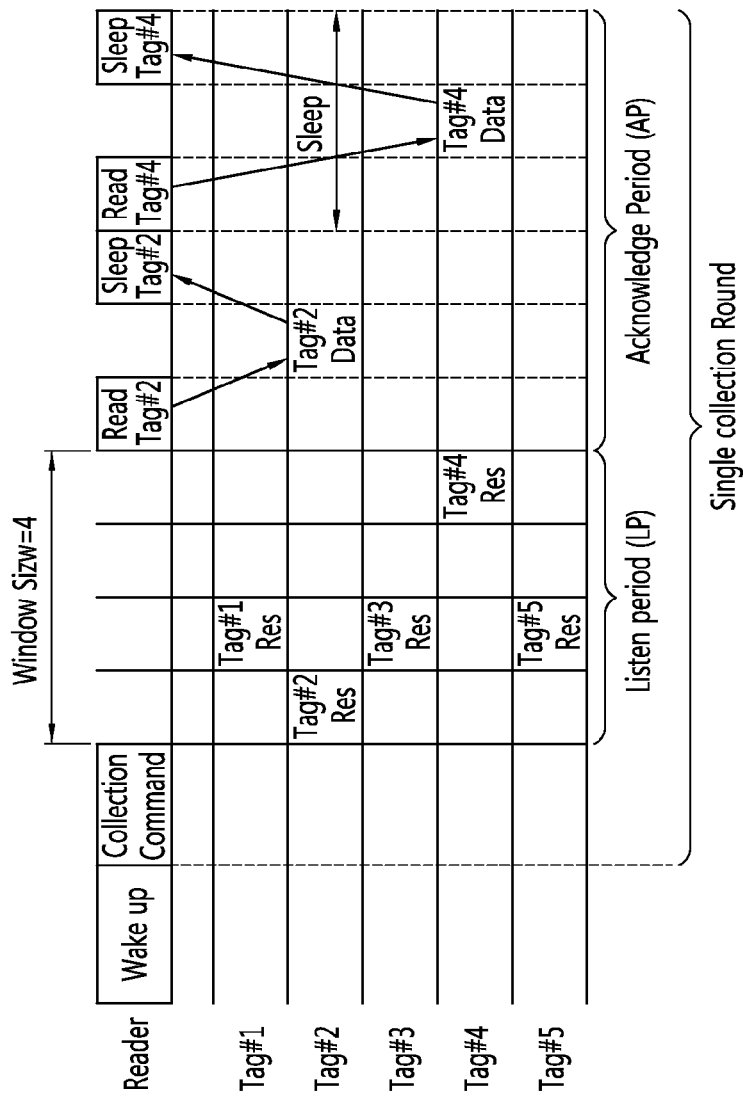
FIG. 1 is a diagram illustrating an operation of collecting tags in the existing standard according to an embodiment.

The embodiment may have various modifications, and various embodiments may be provided. Hereinafter, a specific embodiment is illustrated in accompanying drawings and will be described with reference to accompanying drawings.

However, the embodiment is not limited to the specific embodiment, but the embodiment includes all modifications, equivalents, and substitutes belonging to the technical scope of the embodiment without departing from the spirit of the embodiment.

The terms "first" and "second" can be used to refer to various components, but the components may not be limited to the above terms. The terms will be used to discriminate one component from the other component. For instance, the first component may be referred to the second component and vice versa without departing from the right of the disclosure. The term "and/or" will be used to refer to the combination of plural items or any one item of the plural items.

In addition, when a component is referred to as being "connected to" or "linked to" another component, the component may be directly connected to or linked to another component or an intervening component may be present therebetween. In contrast, if a component is referred to as being "directly connected to" or "directly linked to" another component, an intervening component may not be present therebetween.

The terms used in the specification are for the purpose of explaining specific embodiments and have no intention to limit the disclosure. Unless the context indicates otherwise, the singular expression may include the plural expression. In the following description, the term "include" or "has" will be used to refer to the feature, the number, the step, the operation, the component, the part or the combination thereof without excluding the presence or addition of one or more features, the numbers, the steps, the operations, the components, the parts or the combinations thereof.

Unless defined otherwise, the terms including technical and scientific terms used in this specification may have the meaning that can be commonly apprehended by those skilled in the art. The terms, such as the terms defined in the commonly-used dictionary, must be interpreted based on the context of the related technology and must not be interpreted ideally or excessively.

Hereinafter, exemplary embodiments will be described in more detail with reference to accompanying drawings. In the following description, for the illustrative purpose, the same components will be assigned with the same reference numerals, and the repetition in the description about the same components will be omitted in order to avoid redundancy.

Method for Collecting Tags

The present invention provides a method for selecting a slot based on a dynamic framed slotted ALOHA (DFSA) by using an active RFID system including a reader and an active tag as a target.

The method for collecting tag information according to the present invention includes an LP step of searching tags and an AP step of transmitting real data of the tags searched in the LP step. Before tag collection, a reader switches tags to a preparation state capable of transmitting data by broadcasting a wake up command to tags.

The LP step which is a first step of the tag collection includes a plurality of scan periods. The scan period is repeated until IDs of tags are recognized. The reader broadcasts a scan command to tags in a transmission range so that the scan period starts. Transmission of a first scan command after a wake up command represents start of the LP. The scan command includes a window size. The scan command is transmitted by setting bits representing slot information in a bit map having a bit stream length corresponding to the window size. Bit 0 of the bit map represents idle, bit 1 of the bit map represents success, and bit 2 of the bit map represents collision. A value of the bit map at the first scan command is 0.

Tags receiving a scan command from the reader randomly select a slot in the window size included in the scan command to transmit a tag-ID thereof. In this case, unlike the related art where each tag selects one from entire slots to transmit a tag-ID, the tags select the slot by dividing the slot into a collision slot and a shared slot considering the number of collided tags to transmit a tag-ID thereof. Respective tags determine whether a slot selected by the tags is succeeded through the bit map in the scan command. If the tag confirms that its tag-ID is successfully recognized by the reader, i.e., a case where a slot selected by the tag from the bit map is bit 1, the tag is directly switched to a sleep mode and waits. If the tag confirms that the tag-ID thereof is collided, i.e., a case where a slot selected by the tag from the bit map is bit 2, the tag selects a slot by the method for selecting a slot according to the present invention.

A tag which is not recognized due to collision may occur after a first scan period. A scan command transmitted from the reader in order to newly start the scan period include bit map information based on a slot state of a previous scan period. Tag confirming that the tag-ID is collided selects one from 0 or 1. The tag selecting 0 transmits from a slot among slots for the collision tag. The tag selecting 1 transmits from a slot among shared slots. In this case, the number of slots for the collision tag is given as the number of collided slots, that is, the number indicating a bit 2 in the bit map. Further, the collision tag may select and transmit a slot corresponding to a collision order corresponding to a slot selected by the collision tag among slots from the collision tag. For example, a tag of a slot in which first collision occurs transmits from a first slot among slots for the collision tag. Collision tags selecting the shared slot selects a slot except for a value between 1 and the number of bit 2 in the bit map (or except for the number of bit 2 in the bit map in the window size) to transmit a tag response at a corresponding slot.

Figure 2:
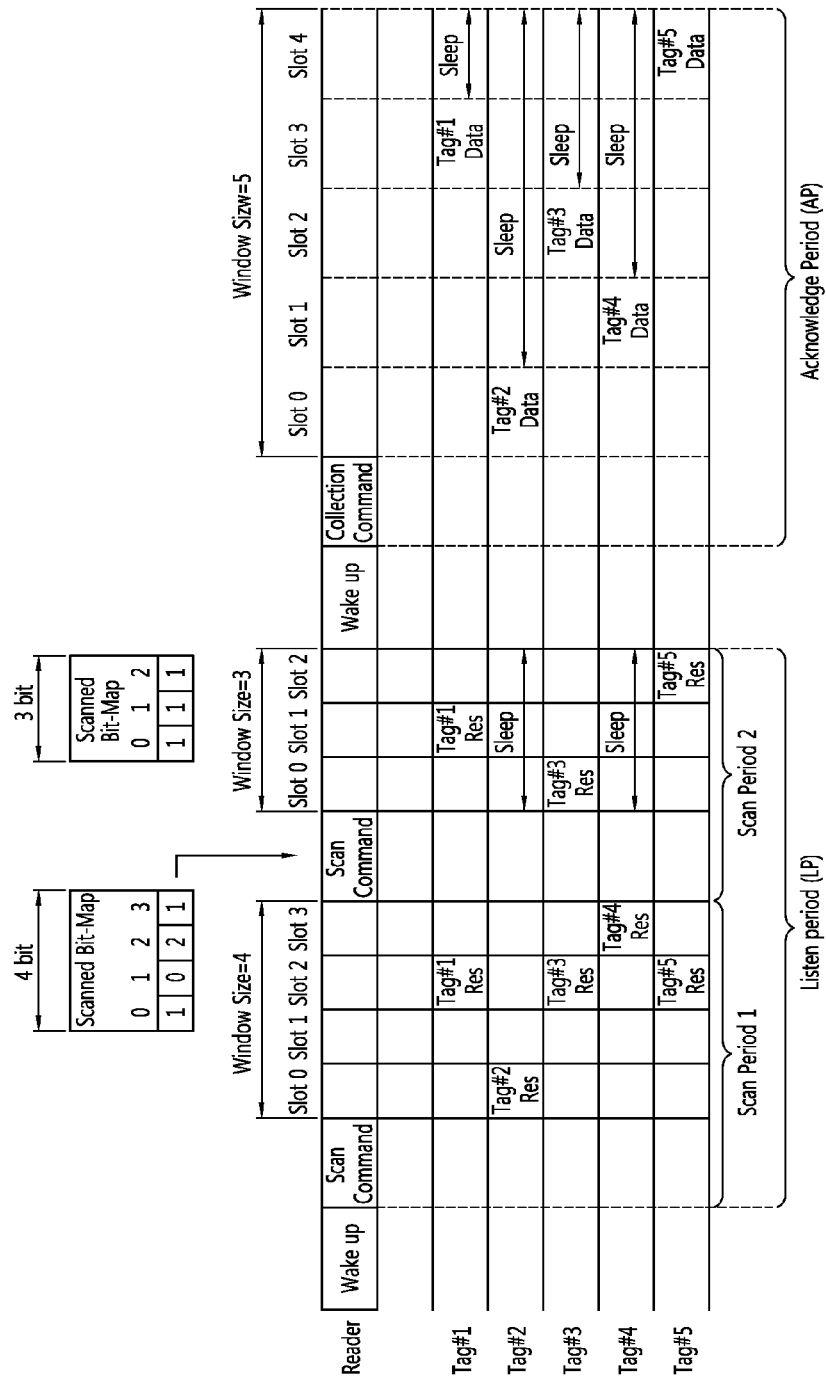
FIG. 2 is a diagram illustrating a method for collecting tags according to an embodiment of the present invention.

FIG. 2 is a diagram illustrating a method for collecting tags according to an embodiment of the present invention.

Referring to FIG. 2, it is assumed that four slots are allotted at a first scan period of the LP. Four bits represent 0 in the bit map. Only bits of 0 may be configured on the assumption that all slots are an idle slot in a bit map included in the scan command at a first scan period. The reader successfully recognizes tag 2 and tag 4 in the first scan period of FIG. 2. A bit 1 is recorded in a bit map corresponding to the 1st slot at a first scan period in a bit map at a scan command for the second scan period. However, since the tag 1, the tag 3, and the tag 5 transmit at the same slot, the reader detects collision at slot 2 and record bit 2 in the bit map. In this case, an order of tags having bit 1 may be stored in the reader. As a bit confirmation result, since there is a bit having a bit value 2 in the bit map, the reader transmits a scan command for a new scan period. In this case, the scan command includes bit map information. Tags receiving a bit map of the scan command determine whether the tags are successfully recognized or not. Tag 2 and tag 4, succeeding the recognition, wait in a sleep mode unit there is a wake up command.

Figure 3:
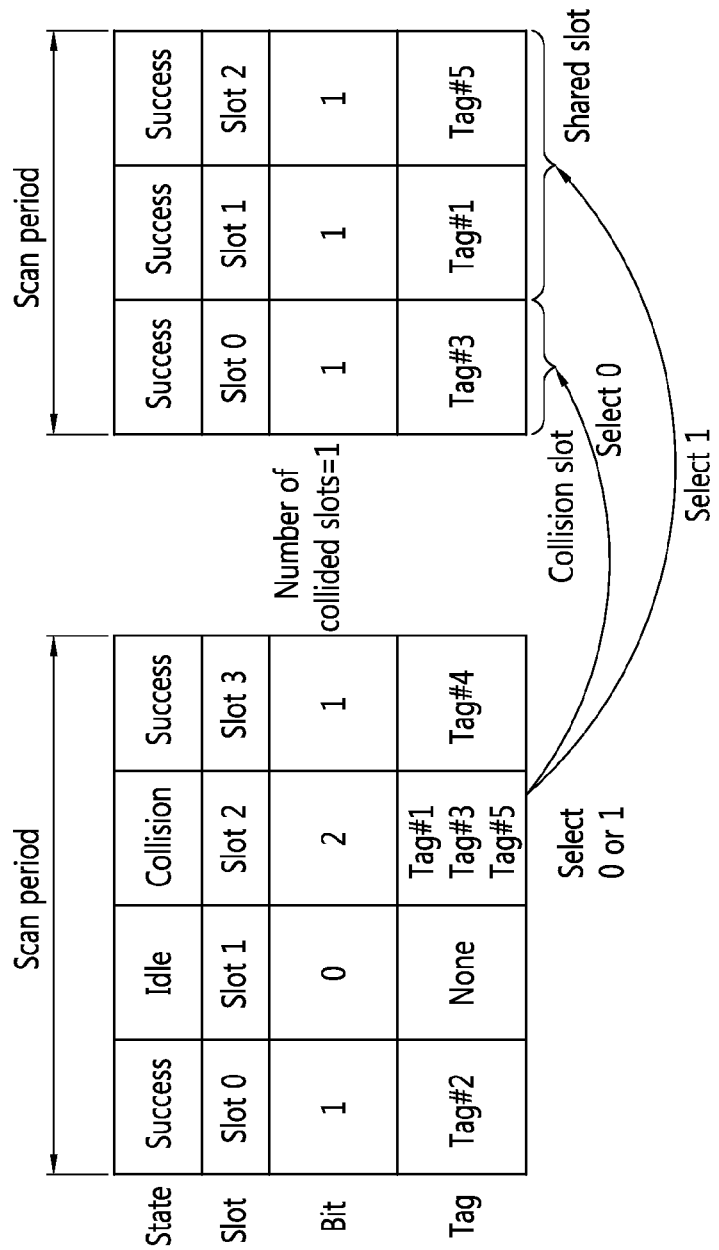
FIG. 3 is a diagram illustrating slot selection according to an LP operation of a method for collecting tags according to an embodiment of the present invention.

FIG. 3 is a diagram illustrating slot selection according to an LP operation of a method for collecting tags according to an embodiment of the present invention.

Referring to FIG. 3, if tag 1, tag 3, and tag 5 recognize that the tag is a collision tag, the tag 1, the tag 3, and the tag 5 simultaneously select the slot 2 by the method for determining the slot according to the present invention. The tag 1, the tag 3, and the tag 5 select a number 0 (collision slot) or 1 (shared slot). The tag 3 selecting 0 (collision slot) selects a first slot which is a slot for a collision tag allotted corresponding to the number of collided slots (the number of the collided slot is 1). The tag 1 and the tag 5 selecting 1 (shared slot) randomly select one from a second slot or a third slot which is a shared slot except for the collided slot. Tags transmit tag responses at the selected slots.

The reader may determine whether to repeat or stop scan through the bit map. If the bit 2 is not included in the bit map, the reader sends a wake up command and a collection command including the transmission order of the tags and enters an AP which is a second step. Conversely, if a bit 2 is included in the bit map, the reader transmits a new scan command to repeat the scan period.

Figure 4:
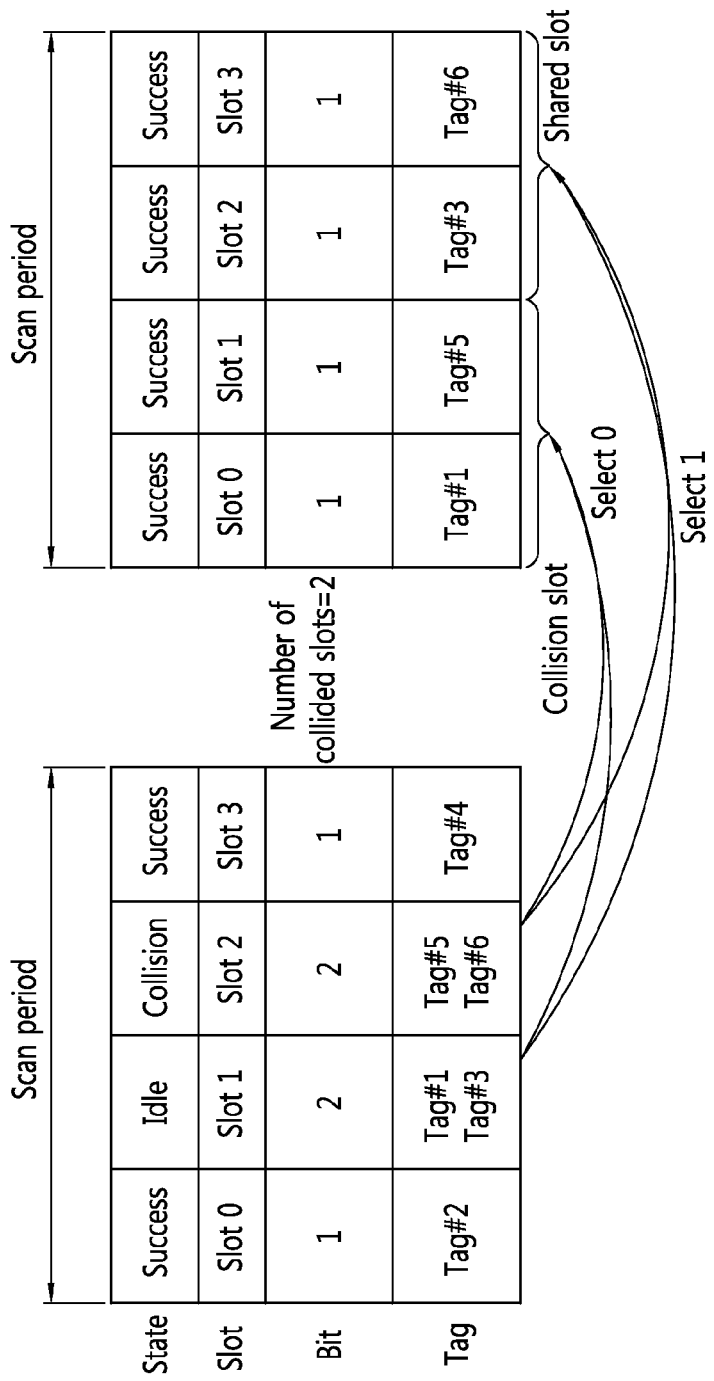
FIG. 4 is a diagram illustrating slot selection according to an LP operation of a method for collecting tags according to another embodiment of the present invention.

FIG. 4 is a diagram illustrating slot selection according to an LP operation of a method for collecting tags according to another embodiment of the present invention.

Referring to FIG. 4, the reader transmits a bit map from a case having two collided slots at the first scan period. Two slots including slot 1 and slot 2 indicated by a bit of 2 in the bit map. Tags responded at the slot 1 and 2 include tag 1, tag 3, tag 5, and tag 6. In this case, the reader may determine a window size of a next scan period as 4 equal to the number of collision tags. Since the number of collided slots in the first scan period is 2, the number of collision slots at the second scan period is 2, and 2 obtained by subtracting the number of collided slots from the total window size of the second scan period is determined as the number of shared slots. Tags may confirm the number of collision slots and the number of shared slots at a next scan period through the bit map. The tags may select the collision slot and the shared slot through randomly selecting 0 (collision slot) or 1 (shared slot). As described above, the tag selecting the 0 sends a tag response in a collision slot at a next scan period corresponding to a collision order at the first scan period. That is, when the tag 1 and the tag 5 select the collided slot, the tag which is firstly collided at the first scan period selects a slot 0 which is a first slot among collided slots at the second scan period to transmit a tag response. In the same manner, the tag 5 which is next collided at the first scan period selects a slot 1 which is a second slot among the collided slots of the second scan period to transmit a tag response. The tag selecting the shared slot may select an arbitrary slot among the shared slots to transmit the tag response. An embodiment of FIG. 4 illustrates that the tag 3 selects a slot 2 and the tag 6 selects a slot 3 to transmit the tag response without collision.

If a LP is terminated, an AP starts. In AP, the tags transmit real data according to a transmission order determined in the LP. When the AP starts, the reader broadcasts a wake up command to all tags in a radius. In order to reduce energy consumption at the LP, tags waiting in the sleep mode receive a wake up command and are switched to a preparation state. After transmitting the wake up command, the reader considers that the tags are in the preparation state and broadcasts the collection command. The collection command includes transmission order information of the tags. The tags transmit data together with a tag-ID according to the transmission order included in the collection command. In this case, the tags terminating the transmission are switched to the sleep mode in order to reduce power consumption and do not participate in data transmission for the rest of the AP.

Referring back to FIG. 2, if the reader confirms that all slots are succeeded as in the second scan period, the reader broadcasts a wake up command starting the AP. The reader transmitting the wake up command determines that all tags within a recognition range are in the preparation state and transmits the collection command. The collection command includes a success order of tags. Respective tags transmit tag-IDs thereof and data in the order. The firstly succeeded tag 2 firstly transmits data and enters a sleep mode. The tag 2, the tag 4, the tag 3, the tag 1, and the tag 5 transmit the data and are switched to the sleep mode in order.

Configuration of an Apparatus for Collecting Tags and a Tag

Figure 5:
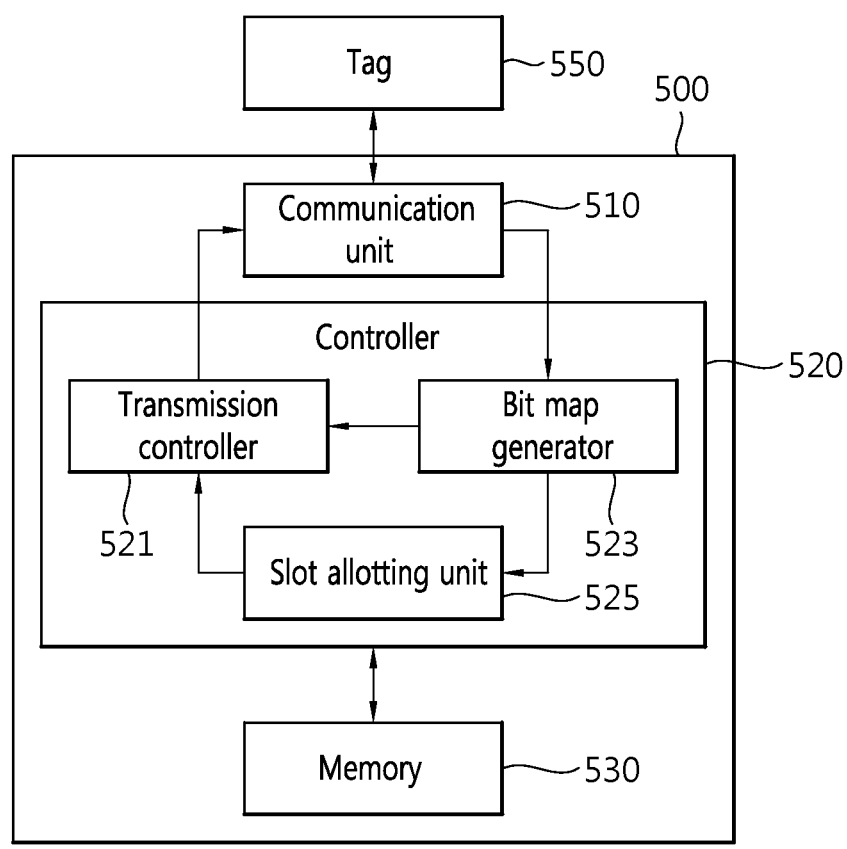
FIG. 5 is a block diagram illustrating a configuration of an apparatus for collecting tags according to an embodiment of the present invention.

FIG. 5 is a block diagram illustrating a configuration of an apparatus for collecting tags according to an embodiment of the present invention. As shown in FIG. 5, the apparatus for collecting tags according to an embodiment of the present invention may include a communication unit 510, a controller 520, and a memory 530. The apparatus for collecting tags may include a tag reader.

Referring to FIG. 5, the communication unit 510 transmits/receives information through wireless communication with the tag 550. The communication unit 510 may broadcast wake up and a scan command from a transmission controller 521 and may transmit the bit map generated from a bit map generator 523 to a tag 550.

The transmission controller 521 controls information to be transmitted through the communication unit 510. The transmission controller 521 controls transmission of wake-up command and a scan command. The transmission controller 521 may transmit whether to transmit a next scan command after the first scan period by parsing a bit map generated from the bit map generator 523. For example, when it is confirmed that the collision does not occur during a previous scan period, the transmission controller 521 may control not to transmit a next scan command.

The bit map generator 523 confirms a state of tags responding to each slot by parsing a tag response of tags 550 received through the communication unit 510, and generates a bit map indicating a collided slot, an idle slot and a recognition success slot. The bit map may be transmitted to the tag 550 through the transmission controller 521 and the communication unit 510.

The slot allotting unit 525 may control allotment of a slot at the scan period and allotment of a slot at a data collection period. The basic window size may be determined by user setting. This may be changed through user interface (not shown). The slot allotting unit 525 may control allotment of a slot at a next scan period based on the bit map generated from the bit map generator 523. The slot allotting unit 525 may determine the number of collided slots at the next scan period and the number of shared slots to configure a scan period by parsing the bit map. The slot allotting unit 525 may add the above information to the scan command to transmit the scan command to the tag 550 through the transmission controller 521.

The memory 530 stores information on tag response and slot allotment in connection with the controller 520. The memory 530 may store a tag response time, a tag response slot, tag ID information, an associated log, and tag recognition success order information. The tag recognition success order information may be used to determine a data transmission order of respective tags at the AP afterwards, and may be included in a data collection command at the AP to be transmitted.

Figure 6:
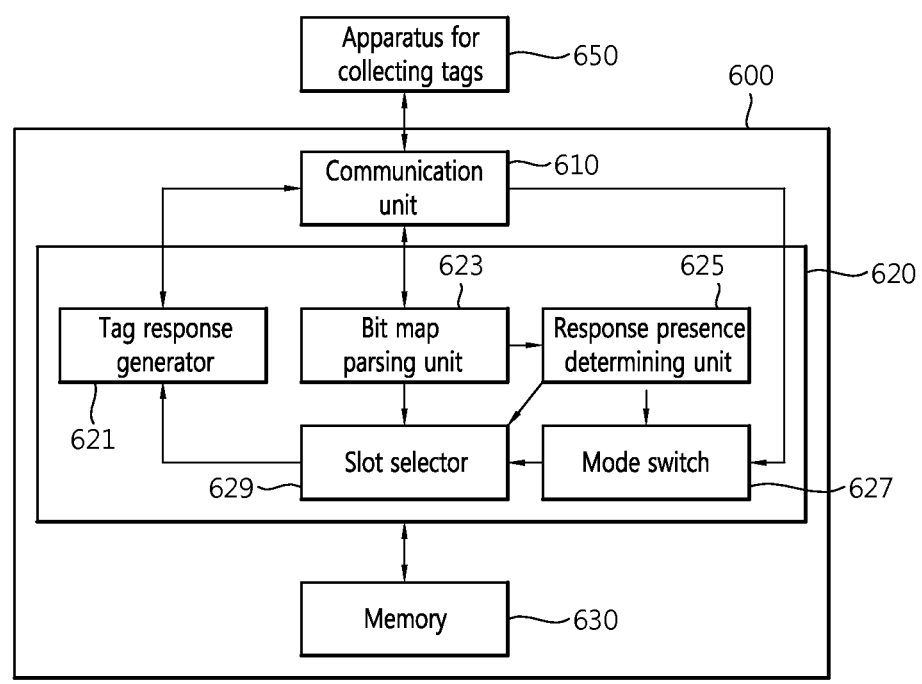
FIG. 6 is a block diagram illustrating a configuration of a tag according to an embodiment of the present invention.

FIG. 6 is a block diagram illustrating a configuration of a tag according to an embodiment of the present invention.

Referring to FIG. 6, the tag according to the embodiment of the present invention includes a communication unit 610, a controller 620, and a memory 630.

Referring to FIG. 6, the communication unit 610 exchanges information with the apparatus 650 for collecting tags through wireless communication. The communication unit 610 may receive a wake up command, a scan command (including bit map information), and a collection command, and may transmit a tag response including a tag ID and data.

The controller 620 may include a tag response generator 621, a bit map parsing unit 623, a response presence determining unit 625, a mode switch 627, and a mode selector 629.

The tag response generator 621 generates a tag response as a response to the scan command or the collection command received through the communication unit 610. It is sufficient that a response to the scan command includes only a tag ID. The response to the collection command may include a tag response with a tag ID and additional data.

The bit map parsing unit 623 parses a bit map included in a scan command received through the communication unit 610. The bit map parsing unit 623 may determine whether the apparatus for collecting tags recognizes the tag through a tag response thereof at a previous scan period based on the bit map thereof. That is, the bit map parsing unit 623 determines whether a bit value of a slot to which the apparatus transmits the tag response is '1' or '2'. When the bit value of the slot is '1', the bit map parsing unit 623 may determine that the recognition is succeeded. When the bit value of the slot is '2', the bit map parsing unit 623 may determine that the recognition fails. The bit map parsing unit 623 may transmit the recognition success presence information to the response presence determining unit 625. Further, the bit map parsing unit 623 parses the bit map. When the collision occurs, the bit map parsing unit 623 may acquire collision order information. That is, the bit map parsing unit 623 may confirm an order of '2' which is a bit value of a slot selected thereby to determine which collision order is the collision. The collision order information may be transmitted to the slot selector 629.

The response presence determining unit 625 may receive the confirmation result from the bit map parsing unit 623 through the recognition success presence information to determine whether to perform the tag response at a next scan period. For example, when recognition success information is received, that is, when a bit value of a lot transmitting a tag response thereby is confirmed as '1' so that the recognition success is parsed, the response presence determining unit 625 may determine not to perform a tag response at the next scan period. In this case, the response presence determining unit 625 transmit information indicating that that the response is not performed so that the mode may be directly switched to the sleep mode. In contrast, when recognition failure information is received, that is, when a bit value of a lot transmitting a tag response thereby is confirmed as '2' so that the recognition failure is parsed, the response presence determining unit 625 may determine to perform a tag response at the next scan period and may transmit a response performing signal to the slot selector 629. Further, if confirming the number of collision slots at a previous scan period by parsing the bit map, the response presence determining unit 625 may detect an order and the number of the shared slots. The above shared slot information may be transmitted to the slot selector 629.

The mode switch 627 receives a response non-performing determining signal from the response presence determining unit 625 and directly switches to the sleep mode. Moreover, when receiving a wake up signal while maintaining the sleep mode until there is a next wake up signal, the mode switch 627 may again switch to active preparation state. According to the embodiment of the present invention, the wake up signal may be received at a start time point of a next AP when recognition of all tags is succeeded.

The slot selector 629 control slot selection of the tag. In the first scan process, the slot selector 629 selects a slot to be transmitted to a tag receiver 650 by the tag. This may be randomly selected. Next, when the response presence determining unit 625 receives a response performing signal to determine to perform the tag response at a next scan period, the slot selector 629 may select one from a collided slot and a shared slot. According to the embodiment of the present invention, if selecting bit '1', the response presence determining unit 625 may transmit the tag response at the shared slot. If selecting bit '0', the response presence determining unit 625 may transmit the tag response at the collision slot. According to the embodiment of the present invention, when selecting the collision slot, the response presence determining unit 625 transmits a slot corresponding to a collision order of collided slots at a previous scan period based on the collision order information transmitted from the bit map generator 623 to transmit a tag response to a corresponding slot. When selecting the shared slots, the response presence determining unit 625 may acquire a range of shared slots (start slot index and the number information of the shared slots through the shared slot information received from the bit map generator 623), and the slot selector 629 selects a slot among the range of shared slots. The slot selector 629 may select a slot to transmit data based on tag recognition success order information at the AP step. Next, the slot selector 629 transmits the selected slot information to the tag response generator 621 such that a tag response or data may be transmitted from the selected slot.

The memory 630 stores data and a tag ID to be transmitted. The memory 630 may store information on the tag response and the slot selection in connection with the controller 620.

Simulation Result

In order to evaluate performance of the present invention, simulation is performed with respect to a tag recognition time, an energy consumption amount, the number of collisions, and the amount of energy consumed due to collisions. The simulation is performed by the active RFID system. The reader recognizes tags within the recognition range as the same recognition probability regardless of a position and assumes that a channel is ideal which has no error or capture effect. The simulation is performed by increasing the number of tags from 100 to 1000. An average value of repeated performance results of 10,000 times is obtained.

Parameters used in the simulation are illustrated in table 1.

TABLE 1

| Parameters | Values |
| --- | --- |
| Wake up command transmission time | 10 ms |
| Scan command transmission time | 2 ms |
| Slot time at LP | 1 ms |
| Collection command transmission time | 2 ms |
| Slot time of AP | 5 ms |
| Power consumption of tag in transmission mode | 56.52 mW |
| Power consumption of tag in reception mode | 105.12 mW |
| Power consumption of tag in sleep mode | 0.72 mW |

Figure 7:
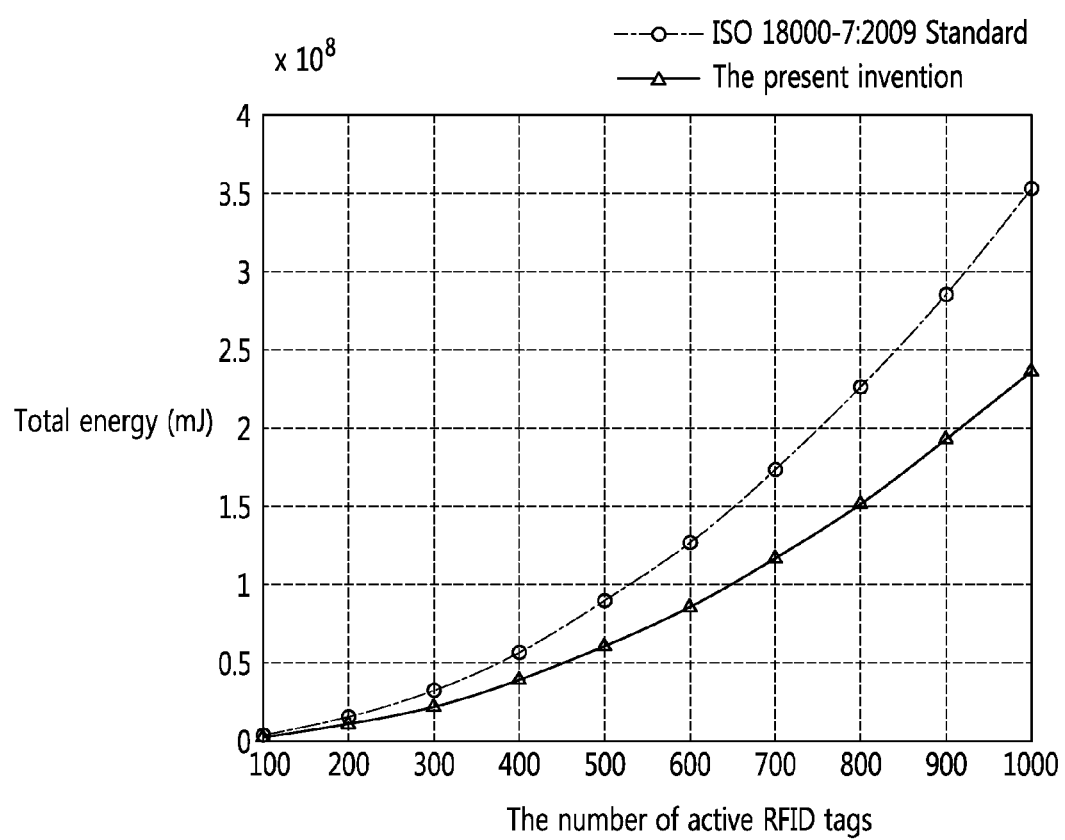
FIG. 7 is a graph comparing total energy consumed to recognize all tags according to the present invention with total energy consumed to recognize all tags according to the related art.
Figure 8:
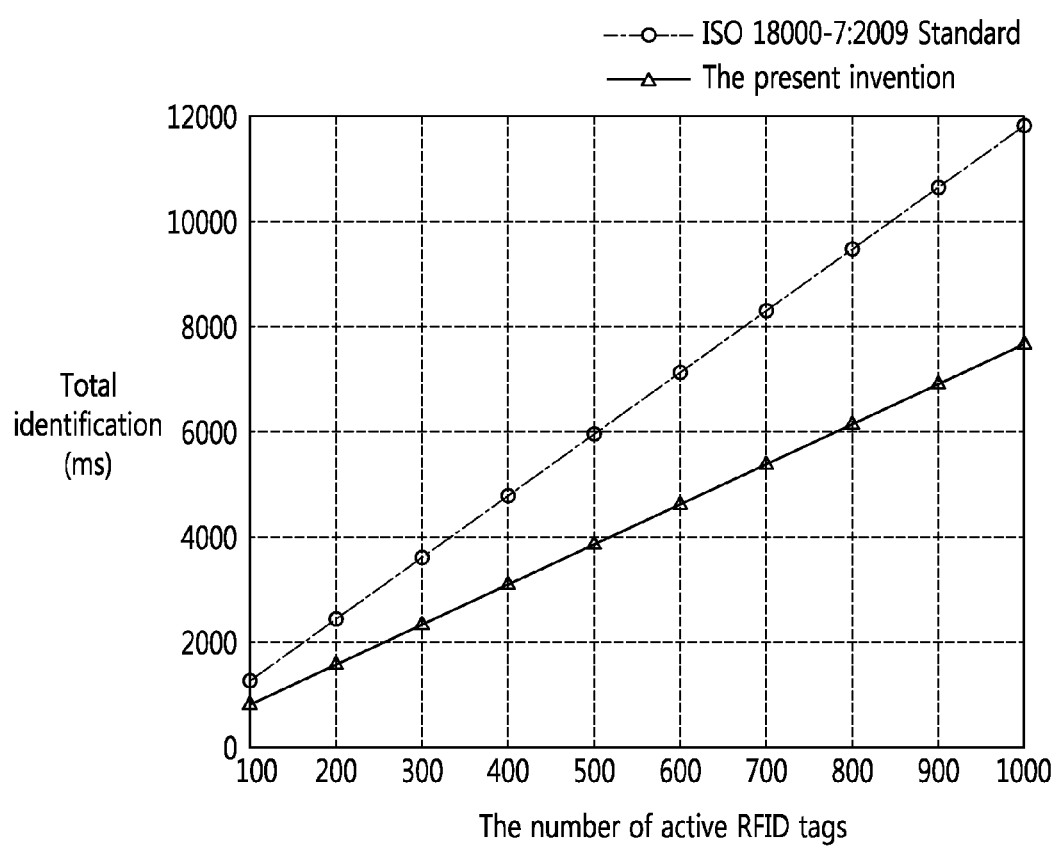
FIG. 8 is a graph comparing a recognition time consumed to recognize all tags according to the present invention with a recognition time consumed to recognize all tags according to the related art.

FIG. 7 is a graph comparing total energy consumed to recognize all tags according to the present invention with total energy consumed to recognize all tags according to the related art. FIG. 8 is a graph comparing a recognition time consumed to recognize all tags according to the present invention with a recognition time consumed to recognize all tags according to the related art.

Referring to FIGS. 7 and 8, the present invention allows that small energy is consumed and a short time is required as compared with an ISO 18000-7 standard. When there are 1000 tags, the present invention may reduce energy consumption of tags by 33.15% and time by 35% as compared with a method of the ISO 18000-7 standard according to the related art. If the tag successfully terminates data transmission at an AP, the present invention automatically enters a sleep mode without reception of the sleep command from the reader. Therefore, the energy consumption and the recognition time may be reduced.

Figure 9:
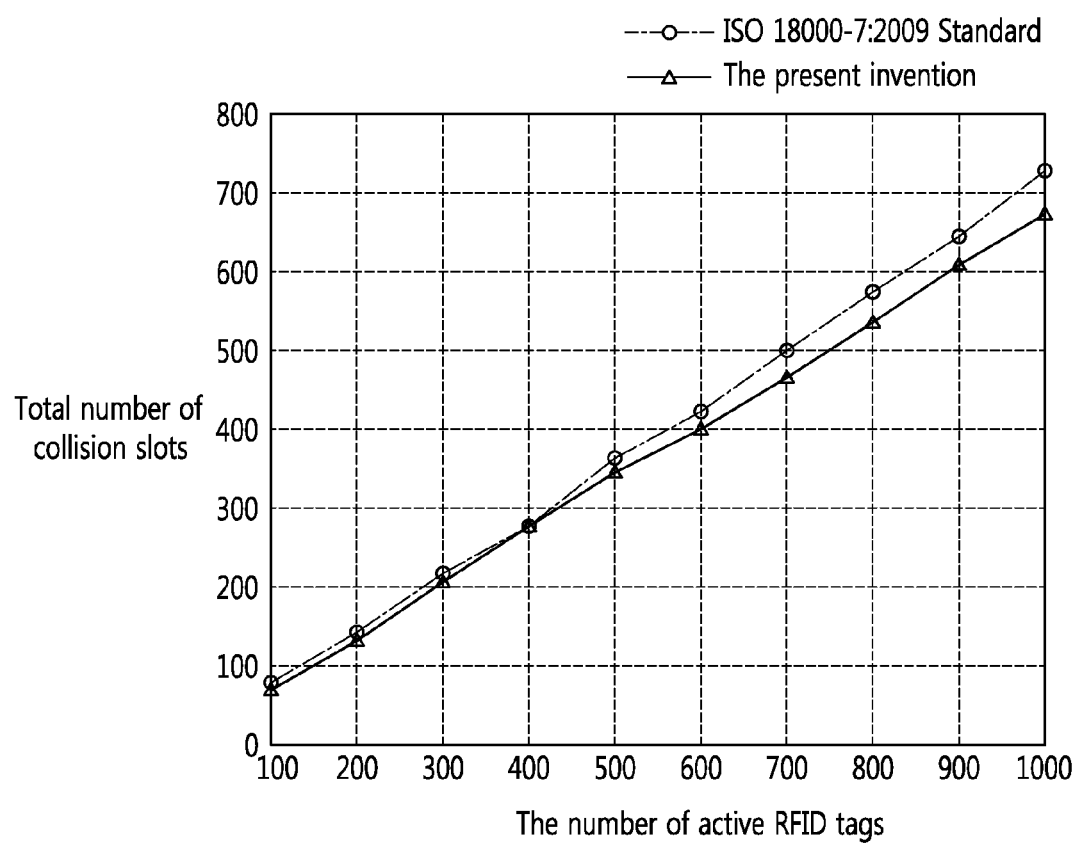
FIG. 9 is a graph comparing the number of times of collisions generated to recognize all tags according to the present invention with the number of times of collisions generated to recognize all tags according to the related art.
Figure 10:
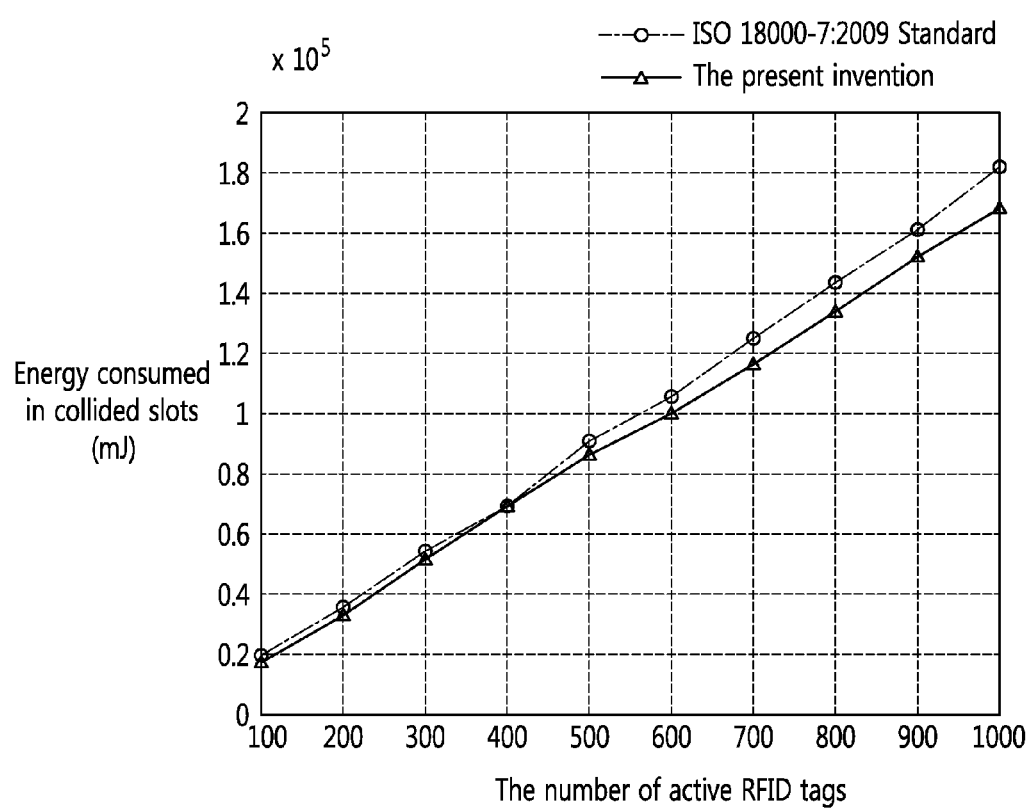
FIG. 10 is a graph comparing energy consumed due to collision generated to recognize all tags according to the present invention with energy consumed due to collision generated to recognize all tags according to the related art.

FIG. 9 is a graph comparing the number of times of collisions generated to recognize all tags according to the present invention with the number of collisions generated to recognize all tags according to the related art, and FIG. 10 is a graph comparing energy consumed due to collision while recognizing all tags according to the present invention with energy consumed due to collision while recognizing all tags according to the related art.

Referring to FIG. 9 and FIG. 10, the present invention reduces the number of collisions as compared with the ISO 18000-7 standard. When there are 900 tags, the present invention may reduce the number of times of collisions by 7% as compared with the method of the ISO-18000-7 standard. The present invention may reduce the number of collisions and energy consumed due to the collisions by dividing collided tags at the LP into two groups such that nodes included in each group has an exclusive slot selection period.

While the invention has been illustrated and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for collecting tags by an apparatus for collecting the tags in a radio frequency identification (RFID) system, one collection round comprising:
   recognizing tags; and
   collecting data from the recognized tags,
   wherein the recognizing of the tags comprises:
      a scan process comprising:
         sending, to the tags, a bit map indicating a corresponding recognition status of each of the tags, the bit map being generated based on a corresponding first tag response from the tags; and
         receiving, from collided tags among the tags, a corresponding second tag response at a corresponding slot, the corresponding slot being dependent on a collision order of selected slots, and
      repeatedly performing the scan process, until all of the tags are recognized, before the collecting of the data.

2. The method of claim 1, wherein the recognizing of the tags further comprises:
   broadcasting a wake-up command to the tags;
   transmitting, to the tags, a first scan command comprising a window size representing a number of slots;
   receiving a tag response comprising a tag identifier (ID) from each of one or more of the tags;
   generating the bit map, indicating whether a tag was recognized in a slot within a first scan period, based on the first tag response; and
   repeatedly performing the scan process until all tags are recognized by transmitting, to the tags, at least a second scan command comprising the bit map.

3. The method of claim 2, wherein the tags are configured to:
   receive the bit map included in the second scan command,
   switch to a sleep mode in response to being successfully recognized, and
   wait until a next wake-up command.

4. The method of claim 2, wherein a second scan period comprises a window size comprising a number of slots corresponding to a number of tags which were not recognized in the first scan period due to collision, and the second scan command comprises the window size for the second scan period.

5. The method of claim 4, wherein the second scan period comprises collision slots corresponding to a number of slots collided at the first scan period and shared slots corresponding to a number of slots excluding the number of the collided slots from the window size of the second scan period.

6. The method of claim 5, wherein the collided tags, each recognizing the collision through the bit map, select one slot from among the collision slots and the shared slots at the second scan period, and transmit the corresponding second tag response using the one of the collision slots and the shared slots according to the selection.

7. The method of claim 6, wherein, at the second scan period, a collided tag selecting a collision slot selects, from the collision slots, a slot based on a corresponding collision order of a slot selected by the collided tag at the first scan period to transmit a corresponding second tag response at the selected slot.

8. The method of claim 6, wherein a collided tag selecting a shared slot selects one from the shared slots to transmit a corresponding second tag response at the selected shared slot at the second scan period.

9. The method of claim 1, wherein the bit map comprises bit information indicating at least three different values of the corresponding recognition status, wherein
a first value of the at least three different values represents an idle slot having no tag response,
a second different value thereof represents a recognition success slot, and
a third different value thereof represents a collided slot.

10. The method of claim 1, wherein the collecting of the data from recognized tags comprises:
broadcasting a wake-up command to the tags;
broadcasting a collection command to the tags; and
receiving tag ID information and data from the tags,
wherein the collection command comprises tag recognition success order information of each of the tags.

11. The method of claim 10, wherein the data are received from the tags based on the order information, and the tags are switched to a sleep mode in response to terminating the data transmission.

12. An apparatus for collecting tags in a RFID, the apparatus comprising:
a controller configured to:
generate a bit map indicating recognition statuses of tags and send the bit map to the tags in a scan process, the bit map being generated based on a corresponding first tag response from each of the tags,
receive, from collided tags among the tags, a corresponding second tag response at a corresponding slot, the corresponding slot being dependent on a collision order of selected slots,
repeatedly perform the scan process until all of the tags are recognized, and
collect data from the recognized tags after all of the tags are successfully recognized.

13. The apparatus of claim 12, wherein the controller comprises:
a transmission controller configured to broadcast a wake-up command and a first scan command comprising a window size to tags within a tag recognition range; and
a bit map generator configured to generate the bit map based on the corresponding first tag response comprising a corresponding tag ID received from each of the tags,
wherein the transmission controller is further configured to transmit a second scan command comprising the bit map to the tags.

14. A system for collecting tags in a RFID, the system comprising:
an apparatus for collecting the tags, the apparatus configured to:
generate a bit map indicating recognition statuses of tags in a scan process, the bit map being generated based on a corresponding first tag response from each of the tags within a first scan period of the scan process,
receive, from collided tags among the tags, a corresponding second tag response at a corresponding slot within a second scan period of the scan process, the corresponding slot being selected, respectively by the collided tags, based on a collision order of slots selected by the collided tags at the first scan period,
repeatedly perform the scan process until all of the tags are recognized, and
collect data from the recognized tags after all of the tags are successfully recognized; and
each of the tags configured to:
transmit the tag response in the first scan period,
receive the bit map,
determine, based on the bit map, whether the tag is successfully recognized to determine whether to transmit the second tag response in the second scan period.

15. The system of claim 14, wherein the apparatus for collecting the tags is further configured to:
transmit a wake-up command and a first scan command comprising a window size to tags within a tag recognition range,
receive the corresponding first tag response comprising a tag ID from each of the tags,
transmit, to the tags, a second scan command comprising the bit map; and
wherein each of the tags is further configured to:
transmit the corresponding first tag response at the first scan period,
determine whether to transmit the corresponding second tag response at the second scan period based on the bit map included in the second scan command,
switch to a sleep mode in response to being successfully recognized in the first scan period, and
a collided tag of the tags is configured to transmit a corresponding second tag response in the second scan period in response to a collision in the first scan period.

16. The system of claim 15, wherein the second scan period comprises collision slots corresponding to a number of collided slots at the first scan period and shared slots corresponding to the window size of the second scan period excluding the number of the collided slots, and
the collided tag selects one slot from the collision slots and the shared slots to transmit a tag response.

17. The system of claim 16, wherein, at the second scan period, the collided tag, selecting the one slot from among the collision slots, selects a slot based on a corresponding collision order of a slot selected by the collided tag at the first scan period to transmit the tag response at the selected one slot.

18. The system of claim 16, wherein the collided tag selecting the shared slot selects one from the shared slots to transmit the tag response at the selected shared slot during the second scan period.

19. The system of claim 16, wherein the apparatus for collecting the tags broadcasts, to the tags, the wake-up command and a collection command comprising tag recognition success order information of the tags, and receives tag ID and data from the tags, wherein the tags transmit data from the tags based on the order information, and the tags switch to a sleep mode in response to terminating data transmission.

* * * * *